United States Patent
Buchin et al.

(10) Patent No.: US 8,605,896 B2
(45) Date of Patent: Dec. 10, 2013

(54) DEVICE AND METHOD FOR PROCESSING DATASTREAMS

(75) Inventors: Boyd Buchin, Brannenburg (DE); Ingo Voll, Wustermark (DE); Dieter Soergel, Altlandsberg (DE)

(73) Assignee: Rohde & Schwarz GmbH & Co. KG, München (DE)

( * ) Notice: Subject to any disclaimer, the term of this patent is extended or adjusted under 35 U.S.C. 154(b) by 919 days.

(21) Appl. No.: 12/443,386

(22) PCT Filed: May 21, 2008

(86) PCT No.: PCT/EP2008/004077
§ 371 (c)(1),
(2), (4) Date: Apr. 28, 2009

(87) PCT Pub. No.: WO2008/151710
PCT Pub. Date: Dec. 18, 2008

(65) Prior Publication Data
US 2010/0027782 A1    Feb. 4, 2010

(30) Foreign Application Priority Data

Jun. 11, 2007 (DE) .......................... 10 2007 026 886
Sep. 26, 2007 (DE) .......................... 10 2007 046 023
Dec. 17, 2007 (DE) .......................... 10 2007 060 675

(51) Int. Cl.
*H04L 29/04* (2006.01)
(52) U.S. Cl.
USPC ............... 380/33; 380/42; 380/255; 380/277; 713/160; 713/166
(58) Field of Classification Search
None
See application file for complete search history.

(56) References Cited

U.S. PATENT DOCUMENTS

| 6,101,255 A * | 8/2000 | Harrison et al. ................. 380/52 |
| 6,674,767 B1 | 1/2004 | Kadyk et al. |
| 7,509,141 B1 * | 3/2009 | Koenck et al. ............. 455/552.1 |
| 7,681,036 B1 * | 3/2010 | Zuber et al. ................... 713/166 |
| 2002/0083344 A1 | 6/2002 | Vairavan |
| 2004/0044902 A1 | 3/2004 | Luthi |
| 2004/0052372 A1 | 3/2004 | Jakoubek |
| 2005/0198412 A1 | 9/2005 | Pedersen et al. |

FOREIGN PATENT DOCUMENTS

DE    10 2005 050 174    3/2007

OTHER PUBLICATIONS

Beckwith et al. High Assurance Security/Safety for Deeply Embedded, Real-time Systems, 2004, Embedded Systems Conference, ESC-247 & ESC-267.*
International Search Report for PCT/EP2008/004077 dated Jan. 23, 2009.

* cited by examiner

*Primary Examiner* — Jung Kim
*Assistant Examiner* — Adrian Stoica
(74) *Attorney, Agent, or Firm* — Marshall, Gerstein & Borun LLP

(57) ABSTRACT

The invention relates to a device for processing datastreams in a communications unit with two mutually-separate data-processing regions, which provide at least two separate message paths. The message paths are connected respectively to a message transmitter and a message receiver, wherein, in each message path, an encoding module is provided, which is connected both to a first data-processing region and also to a second data-processing region. Furthermore, in the second data-processing region, a distribution unit is provided, which is connected to the message paths of the first data-processing region and to all encoding modules of the corresponding message paths in order to distribute given messages in a targeted manner.

32 Claims, 3 Drawing Sheets

DEVICE AND METHOD FOR PROCESSING DATASTREAMS

BACKGROUND OF THE INVENTION

1. Field of the Invention

The invention relates to a device and a method for processing datastreams in a communications unit.

2. Related Technology

A communications network is known from DE 10 2005 050 174 A1, which provides integrated central devices, wherein, for security-relevant reasons, one part of the device-internal data processing is done with encoded data and also with encoded service-quality data.

With this communications network, it is disadvantageous that the infrastructure provided therein meets only a single, defined standard, and the participating devices are conventional 1-line devices, which process a single radio communication method.

SUMMARY

The invention provides a device and a method, with which several different infrastructures are realized simultaneously within a device for encoded data communication, and a participant can use several lines or respectively radio methods simultaneously or in alternation.

Accordingly, the invention provides a device for processing datastreams in a communications unit with two mutually-separate data-processinq regions, which provide at least two separate message paths, which are connected respectively to a message transmitter and respectively to a message receiver, wherein, in each message path, an encoding module is provided, which is connected both to a first data-processing region and also to a second data-processing region, and wherein a distribution unit is provided, which is connected to the message paths of the second data-processing region and to all encoding modules of the corresponding message paths for the targeted distribution of given messages.

Further, the invention provides a method for processing datastreams in a communications unit, wherein the datastreams are processed in two separate data-processing regions, and wherein the datastreams are transported in at least two separate message paths between respectively a message transmitter and respectively a message receiver and are encoded or decoded in each case by an encoding module in the corresponding message path, and wherein each encoding module is connected to a distribution unit, which distributes given messages within a first data-processing region and given messages within a second data-processing region in a targeted manner to various message paths.

Accordingly, the device according to the invention for processing datastreams provides a communications unit with two mutually-separate data-processing regions, which are connected to one another via at least two separate message paths, wherein the message paths provide respectively a message transmitter and respectively a message receiver. An encoding module, which is connected both to a first data-processing region and also to a second data-processing region, is provided in each message path. Furthermore, a distribution unit, which is connected to the message paths of the first data-processing region and to all encoding modules of the corresponding message paths for a targeted distribution of given messages, is provided in the second data-processing region.

The advantages achieved with the invention consist, in particular, in that the device according to the invention provides several message paths or radio lines in its communications unit. Accordingly, the device according to the invention can be used as a gateway between at least two differently-designed networks.

Two mutually-separate data-processing regions are advantageously provided, wherein sensitive data are processed in the first data-processing region, and non-sensitive data are processed in the second data-processing region. This ensures that sensitive and non-sensitive data are always separated and cannot be mixed.

This advantageously reduces the cost for the installation of several network hardware units provided as a network transition (gateway) for a network infrastructure, because, with the use of the device according to the invention, only a single hardware unit needs to be operated as a network transition or gateway within several networks to be connected.

Moreover, it is advantageous, if the device according to the invention is also conceived as a terminal device for the network participant. The device according to the invention advantageously provides as a communications unit an SDR radio device (Software Defined Radio, that is to say, a software-based radio device), in which several (radio) lines are realized via a software program, so that this radio device can be adapted in a flexible manner to the respective standards for network planning. Several conventional radio devices can advantageously be replaced with the device according to the invention.

Furthermore, it is advantageous, if the Internet Protocol (IP) technology is implemented in the device according to the invention, so that relatively large and non-homogenous network regions can be connected or networked with one another.

In particular, it is advantageous, if the device according to the invention provides a communications unit, which provides several radio lines or message paths, which can be networked with one another according to previously-defined rules. Accordingly, a routing function between different networks, such as an IP-based network and a network for a government-authorities radio is provided by means of the device according to the invention or respectively by the method according to the invention, wherein, according to the advantages of the present invention, the protection of information is constantly guaranteed.

Furthermore, it is advantageous, if the communications unit of the device according to the invention provides an internal-encoding capability by means of the encoding module integrated within it. Accordingly, the information protection for high-confidentiality data (sensitive data) is secured in the case of a transmission via publicly-accessible networks.

Beyond this, it is advantageous that data of different domains, for example, data from different departments of a company, and data of different classification with regard to their confidentiality can be processed on a single platform or within the device according to the invention in such a manner that confidential data are kept within a previously-defined region. In particular, it is advantageous that, in the un-encoded condition, confidential data (sensitive data) are strictly separated from less-confidential data.

According to one advantageous development of the device according to the invention, test rules for a data exchange between the various message paths or respectively radio lines of the second data-processing region are provided in every encoding module, wherein the message paths or respectively radio lines within the communications unit advantageously meet different and/or the same communication standards.

The distribution unit of the device according to the invention is expediently connected to a configuration unit. By means of this configuration unit, the test rules and/or the key can be selectively configured in the individual encoding modules by connecting a memory element, in particular a USB plug, which contains the desired configuration data, to the configuration unit.

According to one advantageous further development of the device according to the invention, a bidirectional operating mode is provided for a subset of the message paths provided in the communications unit. For at least one subset of the message paths, a uni-directional operating mode can be provided, which additionally increases the information protection of given data, because, for example, these cannot be transmitted, since only a reception path is provided for this type of data.

The method according to the invention relates to the fact that datastreams are processed in two mutually-separate data-processing regions, wherein the datastreams are transported in at least two separate message paths between respectively one message transmitter and respectively one message receiver and encoded or decoded in each case in an encoding module within the corresponding message path. Each encoding module is connected to a distribution unit within the second data-processing region, which distributes given messages of a datastream in a targeted manner to various message paths within the first data-processing region and the second data-processing region.

According to one advantageous further development of the method according to the invention, test rules for a configurable data exchange between the various message paths of the first data-processing region are implemented in every encoding module. Accordingly, sensitive data are prevented from leaking from this data-processing region in an uncontrolled manner.

One further advantage of the method according to the invention is that test rules for a configurable data exchange between a sensitive datastream and at least one message path are implemented within every encoding module in the second data-processing region. Accordingly, it is possible for sensitive data from the first data-processing region to be encoded and accordingly released for distribution on public networks in a controlled manner.

Moreover, it is advantageous, if the method according to the invention provides that, with the test rules, incoming and/or outgoing communication between the message paths are self-analyzed or automatically analyzed, and datastreams are subdivided on the basis of their level of confidentiality into sensitive and non-sensitive data.

BRIEF DESCRIPTION OF THE DRAWINGS

Exemplary embodiments of the present invention are described below. Both the structure and also the method of operation of the invention and its further advantages and objects are best understood with reference to the following description in conjunction with the associated drawings. The drawings are as follows.

DETAILED DESCRIPTION

Parts corresponding to one another are provided with the same reference numbers in all the drawings.

Figure 1:
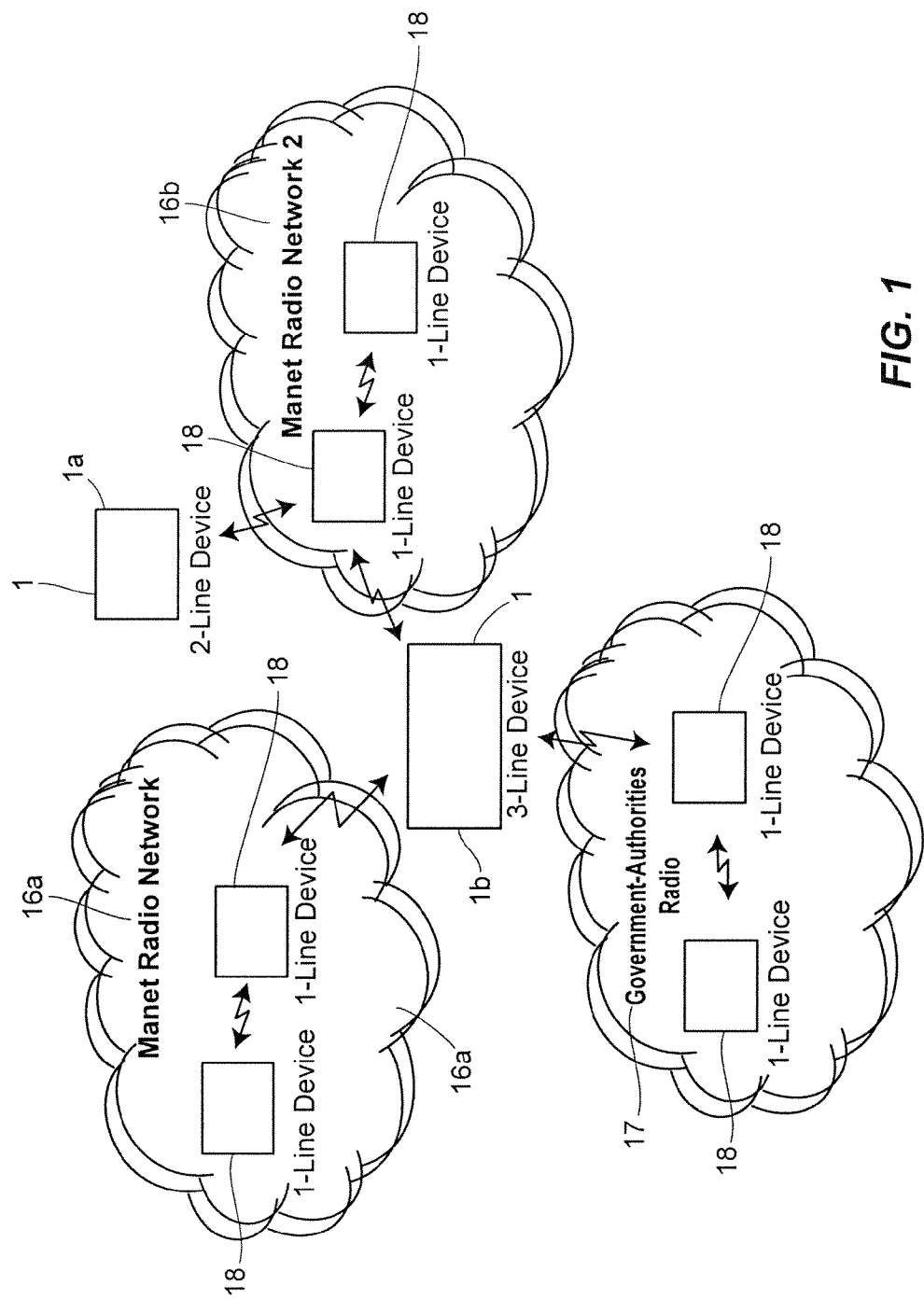
FIG. 1 shows an application scenario for two exemplary embodiments of the device according to the invention provided as a gateway.

FIG. 1 shows an application scenario for two exemplary embodiments 1a, 1b of the device 1 according to the invention provided as a network transition (gateway). In this application scenario, two different Manet radio networks 16a, 16b (Mobile Ad-hoc Networks, self-configuring radio networks) are connected to one another via a first exemplary embodiment 1a of the device 1 according to the invention, wherein this first exemplary embodiment 1a represents a 2-line device, which provides two different message paths 5a, 5b, 5c or lines. Moreover, the application scenario provides a radio network 17 for government authorities, which is connected via a second exemplary embodiment 1b to both Manet radio networks 16a, 16b, wherein the second exemplary embodiment 1b of the device 1 according to the invention represents a 3-line device with three different message paths 5a, 5b, 5c. Conventional radio devices, which are marked here as the 1-line device 18, communicate within the three sub-networks 16a, 16b, 17 of the application scenario.

Figure 2:
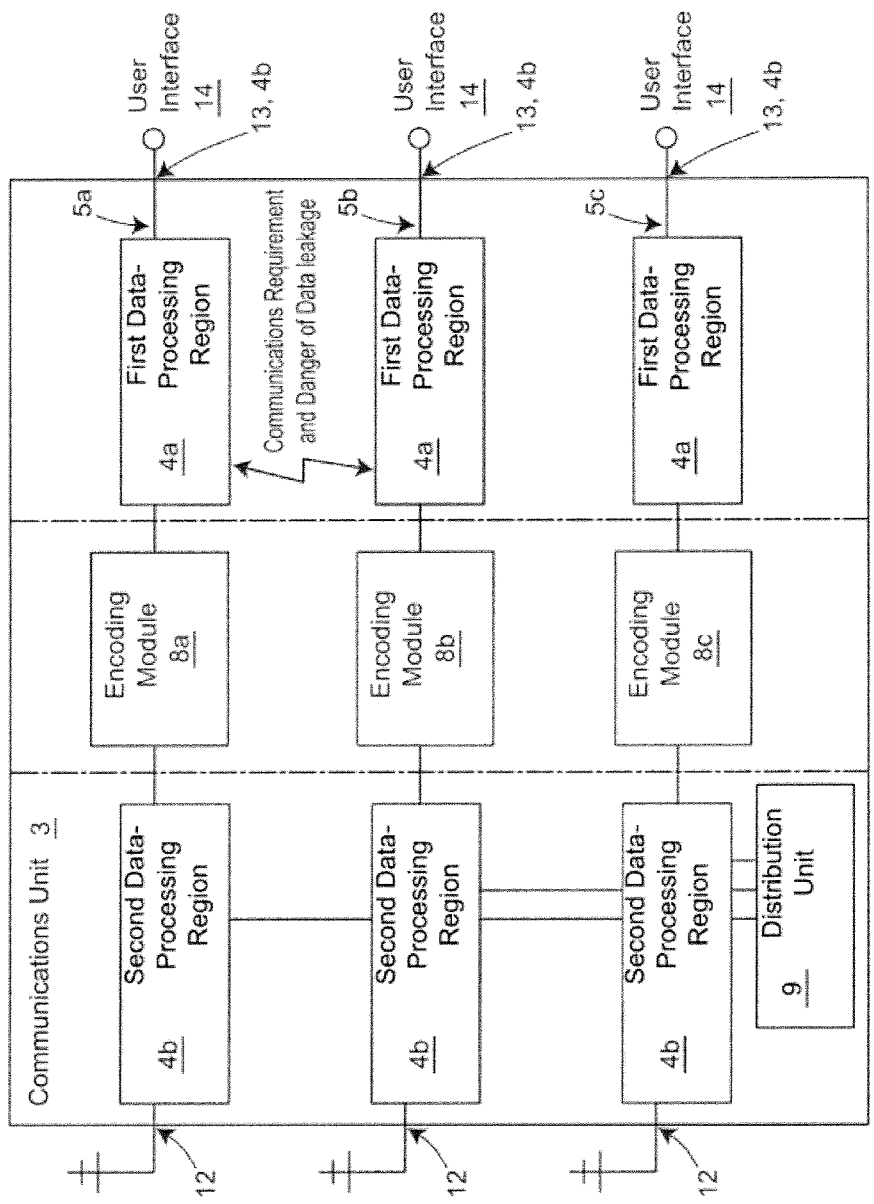
FIG. 2 shows the problem of uncontrolled data leakage in a device for a gateway.

FIG. 2 illustrates the problem of the un-controlled data leakage in a device for a gateway, wherein this device provides three lines or message paths 5a, 5b, 5c. In an open data-processing region 4a, data, especially sensitive data, are supposed to be prevented from being exchanged between the message paths 5a, 5b in an uncontrolled manner.

Figure 3:
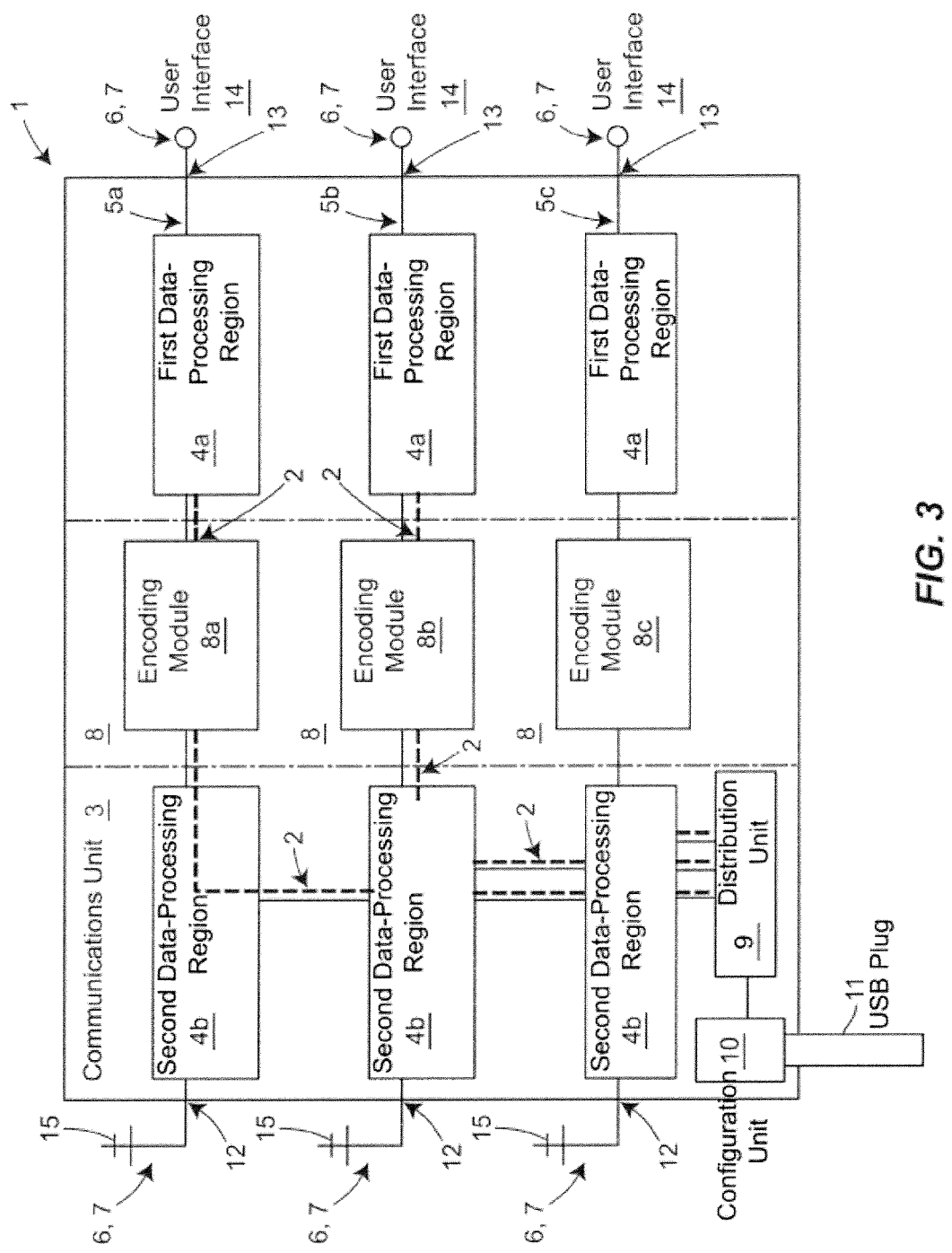
FIG. 3 shows an exemplary embodiment of a device according to the invention with three message paths or respectively lines, which avoids the problem presented in FIG. 2.

FIG. 3 shows the second exemplary embodiment 1b of the device 1 according to the invention with three message paths 5a, 5b, 5c or lines, wherein this exemplary embodiment avoids the problem of uncontrolled data leakage presented in FIG. 2. The device 1 according to the invention for processing datastreams 2 in a communications unit 3 comprises two mutually-separate data-processing regions 4a, 4b, which provide several, separate message paths 5a, 5b, 5c, which are connected respectively to a message transmitter 6 and respectively to a message receiver 7. In each message path 5a, 5b, 5c, respectively one encoding module 8a, 8b, 8c is provided, which is connected both to a first data-processing region 4a and also to a second data-processing region 4b. Furthermore, in the second data-processing region 4b, a distribution unit 9 is provided, which is connected to the message paths 5a, 5b, 5c of the first data-processing region 4a and to all encoding modules 8a, 8b, 8c of the corresponding message paths 5a, 5b, 5c for the targeted distribution of given messages.

In the second data-processing region 4b, the conditioning of the datastream for transmission via the antenna 15 is implemented. This involves amplifiers, modems, filters and a waveform control unit. The substantial requirements result from the respective radio method of the message path 5a, 5b, 5c, wherein no confidential or sensitive data are processed in plain text, that is to say, un-encoded, in the second data-processing region 4b.

The encoding module 8 separates the second data-processing region 4b from the first data-processing region 4a, wherein all confidential data are protected through cryptographic methods, which are implemented in the encoding modules 8a, 8b, 8c.

In the device 1 according to the invention, there is a need for the exchange of data between the individual message paths 5a, 5b, 5c, wherein the data exchange within the second data-processing region 4b is possible without difficulty via standard methods, such as network switches. In this context, information protection for the data is guaranteed because of their encoding.

The data provided for a given message path 5a, 5b, 5c are now addressed and marked for subsequent transfer to the encoding module 8a, 8b, 8c. The encoding module 8a, 8b, 8c checks the authorization of the message path 5a, 5b, 5c for the data exchange and the degree of confidentiality of the data to be transferred. The encoding module 8a, 8b, 8c then marks the data and transfers them together with the address of the receiving message path 5a, 5b, 5c to the second data-processing region 4b.

The encoded data are now transferred via the distribution unit 9 to the second data-processing region 4b of the corresponding message path 5a, 5b, 5c. From there, the encoded data are routed to the encoding module 8a, 8b, 8c of the addressed message path 5a, 5b, 5c, wherein device-internal addressing methods are used. The encoding module 8a, 8b, 8c of the message path 5a, 5b, 5c, which receives the data determined for it, checks the markings and decodes the datastream 2 and transfers the latter to the first data-processing region 4a of this message path 5a, 5b, 5c, where it is further processed according to the radio method of the receiver message path 5a, 5b, 5c. For example, an output to the user interface 14 or a transmission via the antenna 15 etc. is implemented.

Furthermore, in the device 1 according to the invention, a selective distribution of the datastream 2 is provided with reference to different domains with an addressing and/or a different classification with regard to confidentiality or sensitivity. Wherein domains can be different administrative units within an organization, and a different classification of the data relates to how secure the encoding method used must be, that is to say, how confidential the data for the transmitting domain or for the receiving domain should be.

In the first data-processing region 4a, the confidential or sensitive data are processed, wherein the type of data processing depends upon the type of data occurring for the user and upon the radio method in the publicly-accessible region.

The distribution unit 9 allows a general data exchange, which is subject to the implemented test rules, wherein these test rules also access the stored key.

In each encoding module 8a, 8b, 8c, test rules for a data exchange between the various message paths 5a, 5b, 5c of the first data-processing region 4a are provided. The distribution unit 9 in the second data-processing region 4b is connected to a configuration unit 10, so that, via the latter, the test rules can be selectively configured from externally in the encoding modules 8a, 8b, 8c. Furthermore, at least one externally-readable key is stored in each encoding module 8a, 8b, 8c, wherein the key can be read in, for example, by means of a USB plug 11, which can be connected to the configuration unit 10.

The device 1 according to the invention provides that the various message paths 5a, 5b, 5c within a communications unit 3 fulfill different and/or the same communication standards, such as UMTS, GSM or TETRA. In this context, the communications unit 3 is a radio device, in particular, a software-defined radio device (SDR), so that the various radio standards can be loaded in a user-defined manner into the communications unit 3 of the device 1 according to the invention.

Each message path 5a, 5b, 5c provides an antenna 15 at a first end and a user interface 14 at a second end 13. In this context, the user interface 14 can be a human-machine interface or an interface with a further communications device.

The device 1 according to the invention can provide a bi-directional operating mode for one subset of the message path 5a, 5b, 5c and a unidirectional operating mode for a further subset.

In the communications unit 3, the method according to the invention processes datastreams 2 in two mutually-separate data-processing regions 4a, 4b. In this context, the datastreams 2 are transported in at least two separate message paths 5a, 5b, 5c between respectively a message transmitter 6 and respectively a message receiver 7 and encoded or decoded in each case by an encoding module 8a, 8b, 8c in the corresponding message path 5a, 5b, 5c. Each encoding module 8a, 8b, 8c in this context is connected to a distribution unit 9, which distributes given messages of the sensitive datastream 2 and of the non-sensitive datastream 2 in a targeted manner to different message paths 5a, 5b, 5c.

In each encoding module 8a, 8b, 8c, test rules for a configurable data exchange between the various message paths 5a, 5b, 5c of a first data-processing region 4a are implemented for this purpose. Moreover, in each encoding module 8a, 8b, 8c, test rules for a configurable data exchange between the first data-processing region 4a and at least one message path 5a, 5b, 5c of a second data-processing region 4b are implemented.

The method according to the invention includes the fact that the test rules prevent a data leakage from the first data-processing region 4a in the event of an error, wherein the test rules self-test or automatically test incoming and/or outgoing communication between the message paths 5a, 5b, 5c or messages, which are directed to the first data-processing region 4a. In this context, the method according to the invention distinguishes datastreams 2 by means of the implemented test rules on the basis of a degree of confidentiality.

The invention is not restricted to the exemplary embodiment presented in the drawings, in particular, not to a use in radio networks, but can also be used in other communications networks, for example, in IP-based communications networks. All of the features described above and presented in the drawings can be combined with one another as required.

The invention claimed is

1. Device for processing datastreams in a communications unit with two mutually-separate data-processing regions, which provide at least two separate message paths, which are connected respectively to a message transmitter and respectively to a message receiver, the device comprising:
    an encoding module in each message path connected both to a first data-processing region and to a second data-processing region, and
    a distribution unit connected to the message paths of the second data-processing region and to all encoding modules of the corresponding message paths for the targeted distribution of messages, the distribution unit arranged to, within the second data-processing region, distribute messages of the first data-processing region and messages of the second data-processing region in a targeted manner to the various message paths,
    wherein test rules for data exchange, which is performed within the second data-processing region between the various message paths of the first data-processing region, are provided in each encoding module, and
    wherein each encoding module marks each message in its corresponding message path for a data exchange to a specific message path within the second data-processing region on the basis of the test rules and the degree of confidentiality of that message depending on the encoding method used for that message in that encoding module.

2. Device according to claim 1, wherein the first data-processing region is provided for processing of sensitive data, and the second data-processing region is provided for processing of non-sensitive data.

3. Device according to claim 1, wherein in a relay operating mode, a selective distribution of the datastream to the various message paths is provided.

4. Device according to claim 3, wherein the selective distribution of the datastream is provided on the basis of different domains with an addressing and/or different classification with regard to confidentiality.

5. Device according to claim 1, wherein test rules for a configurable data exchange between the first data-processing region and the second data-processing region of a message path are provided in each encoding module.

6. Device according to claim 5, wherein the test rules are address lists and/or other confidentiality tables.

7. Device according to claim 1, wherein in the case of an error, a data leakage from the first data-processing region is prevented.

8. Device according to claim 1, wherein an automatic testing of the incoming and/or outgoing communication between the message paths is provided in the encoding modules.

9. Device according to claim 1, wherein a differentiation of the datastreams on the basis of a degree of confidentiality is provided.

10. Device according to claim 1, wherein the distribution unit is connected to a configuration unit.

11. Device according to claim 5, wherein the test rules are selectively configurable in the encoding modules.

12. Device according to claim 1, wherein at least one key capable of being read in from externally is stored in each encoding module.

13. Device according to claim 12, wherein the key can be read in by a USB plug, which is connected to the configuration unit.

14. Device according to claim 12, wherein the key can be read in by a memory element.

15. Device according to claim 1, wherein the various message paths meet different and/or the same communications standards.

16. Device according to claim 1, wherein the communications unit is a radio device.

17. Device according to claim 1, wherein each message path is connected at a first end to an antenna and at a second end to a user interface.

18. Device according to claim 1, wherein a bi-directional operating mode is provided at least for a subset of the message paths.

19. Device according to claim 1, wherein the communications unit is a software-defined radio device.

20. Method for processing datastreams in a communications unit, comprising processing the datastreams in two separate data-processing regions, and transporting the datastreams in at least two separate message paths between respectively a message transmitter and respectively a message receiver and are encoded or decoded by an encoding module in the corresponding message path, wherein each encoding module is connected to a distribution unit, which, within a second data-processing region, distributes messages of a first data-processing region and messages of the second data-processing region in a targeted manner to various message paths, implementing test rules in each encoding module for a configurable data exchange, which is performed within the second data-processing region between the various message paths of the first data-processing region, wherein each encoding module marks each message in its corresponding message path for a data exchange to a specific message path within the second data-processing region on the basis of the test rules and the degree of confidentiality of that message depending on the encoding method used for that message in that encoding module, and in a relay operating mode, selectively distributing the datastream to the various message paths.

21. Method according to claim 20, comprising processing sensitive data in the first data-processing region, and processing non-sensitive data in the second data-processing region.

22. Method according to claim 20, comprising distributing the datastream on the basis of different domains with an addressing and/or different classification with regard to confidentiality.

23. Method according to claim 20, comprising using address lists and/or confidentiality tables as test rules.

24. Method according to claim 20, comprising implementing test rules for a configurable data exchange between the first data-processing region and the second data-processing region of a message path in every encoding module.

25. Method according to claim 20, comprising in the case of an error, the test rules preventing data leakage from the first data-processing region.

26. Method according to claim 20, comprising with the test rules, automatically testing incoming and/or outgoing communication between the message paths.

27. Method according to claim 20, comprising the test rules distinguishing datastreams on the basis of a degree of confidentiality.

28. Method according to claim 20, wherein a configuration unit is connected to the distribution unit.

29. Method according to claim 20, wherein the test rules are configured selectively in the encoding modules.

30. Method according to claim 29, comprising reading at least one key into every encoding module by a memory element via the configuration unit from externally.

31. Method according to claim 29, comprising reading at least one key into every encoding module by a USB plug memory element via the configuration unit from externally.

32. Method according to claim 20, comprising operating at least one subset of the message paths bi-directionally.

* * * * *